(12) United States Patent
Angst

(10) Patent No.: US 8,679,238 B2
(45) Date of Patent: Mar. 25, 2014

(54) CENTRIFUGAL OIL SEPARATOR FOR AN AIRCRAFT ENGINE

(75) Inventor: Robert Angst, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 516 days.

(21) Appl. No.: 13/097,335

(22) Filed: Apr. 29, 2011

(65) Prior Publication Data

US 2011/0271837 A1 Nov. 10, 2011

(30) Foreign Application Priority Data

May 6, 2010 (DE) .......................... 10 2010 019 604

(51) Int. Cl.
*B03C 3/15* (2006.01)

(52) U.S. Cl.
USPC .................. 96/61; 55/408; 55/409; 95/78

(58) Field of Classification Search
USPC ........... 96/55, 61; 95/63, 70, 78; 55/408, 409, 55/DIG. 17, DIG. 19; 244/1 R
See application file for complete search history.

(56) References Cited

U.S. PATENT DOCUMENTS

| | | | | |
|---|---|---|---|---|
| 1,558,382 A * | 10/1925 | Marx | ............................ | 204/545 |
| 2,537,558 A * | 1/1951 | Tigges | .............................. | 95/70 |
| 3,443,362 A * | 5/1969 | Ebert | ............................... | 96/50 |
| 4,049,401 A | 9/1977 | Smith | | |
| 4,755,103 A | 7/1988 | Streifinger | | |
| 6,663,695 B2 * | 12/2003 | Ike et al. | ............................. | 96/52 |
| 6,858,056 B2 | 2/2005 | Kwan | | |
| 7,510,599 B2 * | 3/2009 | Brothier et al. | .................... | 96/29 |
| 7,569,094 B2 * | 8/2009 | Kane et al. | ......................... | 95/28 |
| 7,704,300 B2 * | 4/2010 | Szepessy | ......................... | 95/69 |
| 7,721,555 B2 | 5/2010 | Sharp | | |
| 8,029,601 B2 * | 10/2011 | Franzen et al. | ................... | 95/77 |
| 2008/0078291 A1 * | 4/2008 | Daukant | ........................... | 95/69 |

FOREIGN PATENT DOCUMENTS

| | | |
|---|---|---|
| DE | 2604180 | 9/1983 |
| DE | 3605619 | 8/1987 |
| DE | 102004004945 | 8/2005 |
| DE | 102006058343 | 7/2008 |
| ER | 1297879 | 4/2003 |
| JP | 61-167466 A * | 7/1986 .......................... 96/61 |

OTHER PUBLICATIONS

European Search Report dated Jul. 21, 2011 from counterpart application.

German Search Report dated Mar. 4, 2011 from counterpart application.

* cited by examiner

*Primary Examiner* — Richard L Chiesa
(74) *Attorney, Agent, or Firm* — Timothy J. Klima; Shuttleworth & Ingersoll, PLC

(57) ABSTRACT

A centrifugal oil separator (3) provided with a metallic foam structure (4) and at least one high-voltage discharge electrode (5) arranged upstream of the metallic foam structure (4) is a component of a hollow engine shaft (2), with the metallic foam structure (4) and the high-voltage discharge electrode(s) (5) being integrated into the engine shaft (2) and energy transmission to the high-voltage discharge electrodes (5) being transformatory. Such a centrifugal oil separator, space-savingly arranged in an engine shaft, enables a high rate of oil separation to be achieved despite the centrifugal forces being low in particular in the area of the engine shaft, thus ensuring low oil consumption and preventing oil-contaminated air from getting into the atmosphere.

5 Claims, 1 Drawing Sheet

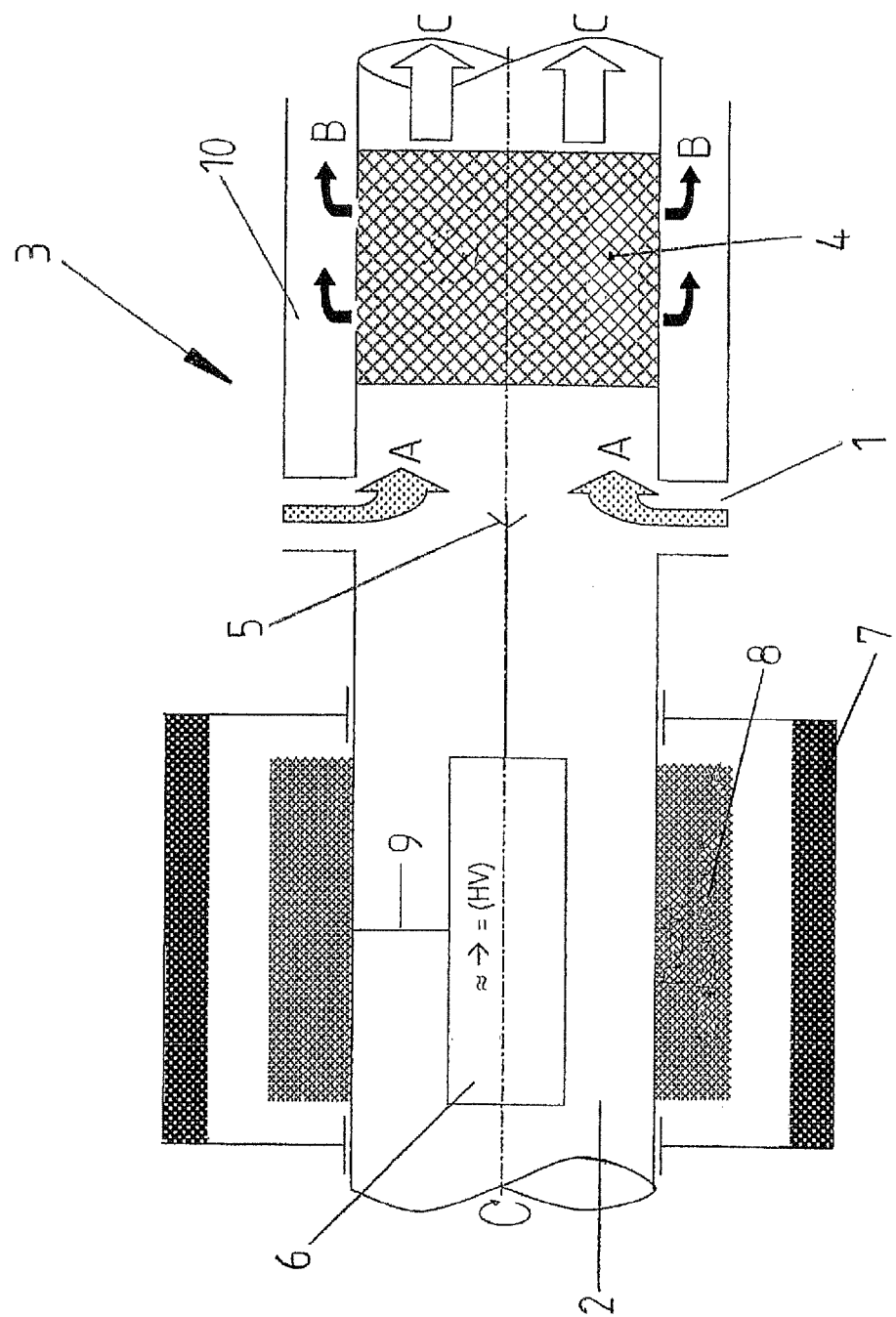

CENTRIFUGAL OIL SEPARATOR FOR AN AIRCRAFT ENGINE

This invention relates to a centrifugal oil separator for an aircraft engine for cleaning the oil particle-mixed vent air, with the oil separator including a rotating hollow body with a metallic foam structure attached therein and at least one high-voltage discharge electrode arranged upstream of the metallic foam structure.

In order to avoid excess air pressure in the oil tank, the gearbox and the bearing chambers, a venting arrangement is integrated in the lubricating system of an engine. However, the air vented from the bearing chambers and the gearbox of the aircraft engine contains oil particles which must be removed as completely as possible from the airflow before being discharged to the atmosphere to both keep oil losses and the disadvantageous consequences of high oil consumption low and minimize the aesthetically negative effects of air with high oil content flowing off to the environment.

For separating the oil content in the air, oil separators based on centrifugal action are employed whose operation can further be improved by a metallic foam structure integrated in and co-rotating with the centrifugal oil separator.

For further improving the effect of the metallic foam structure in terms of the rate of separation, Specification DE 102006058343A1 proposes the provision of at least one high-voltage discharge electrode upstream of the metallic foam structure. As a result of the excessive charge present on the high-voltage discharge electrodes, the air molecules become negatively charged. This excessive charge is passed on to the oil particles which, due to electrostatic attraction, lodge on the surface of the lower charged—earthed—metallic foam structure, with even small oil particles with low mass being lodged on the surfaces of the metallic foam structure and separated from the airflow.

The known centrifugal oil separators of the type mentioned above are separately arranged units and, as such, are disadvantageous in respect of the weight and space requirement incurred with them.

It is a broad aspect of the present invention to provide a centrifugal oil separator for an aircraft engine which ensures a high rate of separation while having low space and weight requirement.

It is a particular object of the present invention to provide solution to the above problematics by a centrifugal oil separator designed in accordance with the features described herein.

Advantageous embodiments of the present invention become apparent from the present description.

The present invention, in its essence, features a centrifugal oil separator, which is a component of a hollow engine shaft, with the oil separator being provided with a metallic foam structure and at least one high-voltage discharge electrode arranged upstream of the metallic foam structure, and with the metallic foam structure and the high-voltage discharge electrode(s) being integrated into the engine shaft and energy transmission to the high-voltage discharge electrodes being transformatory. Such a centrifugal oil separator, space-savingly accommodated in an engine shaft, enables a high rate of oil separation to be achieved despite the centrifugal forces being low in particular in the area of the engine shaft, thus ensuring low oil consumption and preventing oil-contaminated air from getting into the atmosphere, which is undesirable also under aesthetic aspects.

In a further development of the present invention, a receiving coil for transformatory energy transmission is arranged on the outer circumference of the engine shaft, which concentrically encloses and co-rotates with the engine shaft and is concentrically surrounded by a stationary transmitting coil. The receiving coil is connected via a connecting line to a rectifier and high-voltage generator unit connected to the high-voltage discharge electrodes and arranged in the engine shaft.

In an embodiment of the present invention the metallic foam structure is a product known under the trade name Retimet®.

According to a further feature of the present invention, the metallic foam structure is earthed via metallic shaft and bearing.

In a further development of the present invention, a collector housing connected to the engine shaft for collecting and returning the separated oil to an oil tank is arranged on the outer circumference of the metallic foam structure.

An exemplary embodiment of the present invention is more fully described in light of the accompanying Figure.

FIG. 1 schematically shows a centrifugal oil separator integrated into an engine shaft.

As shown in the drawing, the oil particle-mixed air vented from the bearing chambers is fed via an air inlet 1 into a centrifugal oil separator 3 integrated into a hollow engine shaft 2 as per the arrows A. The centrifugal oil separator 3 includes a metallic foam structure 4, known under the trade name Retimet®, which is firmly arranged in and co-rotating with the engine shaft 2. This metallic foam structure 4 is entered by the air-oil mixture. Upstream of the metallic foam structure 4, i.e. in the area of entry of the air-oil mixture, high-voltage discharge electrodes 5 are arranged (for simplicity only one discharge electrode being shown) which are connected to a rectifier and high-voltage generator unit 6 integrated into and co-rotating with the engine shaft 2. Voltage transmission to the rectifier and high-voltage generator unit 6 is transformatory, namely by means of two coils concentrically arranged on the circumference of the engine shaft 2, i.e. a firmly arranged transmitting coil 7 (transmitter) which is independent of the engine shaft 2 and a receiving coil 8 (receiver) which is attached to the outer circumference of the engine shaft 2 and co-rotates with the latter. The receiving coil 8 is connected to the rectifier and high-voltage generator unit 6 by means of a connecting line 9.

The air-oil mixture is ionized at the high-voltage discharge electrodes 5. The thus negatively charged air molecules pass on the excessive charge to the oil droplets which, upon entering into the—earthed and lower charged—metallic foam structure 4, lodge on the surface within the metallic foam structure 4. Despite the relatively low centrifugal forces, which are even just zero in the engine axis, the centrifugal oil separator 3 integrated into the engine shaft 2, as compared to separately configured centrifugal oil separators, allows high separation rates to be achieved since even minute oil particles get lodged on the surface of the metallic foam structure 4 and, as a result of the existing centrifugal forces, are then transported as oil film to the outer circumference of the metallic foam structure 4. The oil, which is essentially completely separated from the air-oil mixture, is collected per arrow B in a collector housing 10 arranged on the outer circumference of the metallic foam structure 4 and returned into the oil tank (not shown) of the engine.

Accordingly, a centrifugal oil separator space and weight-savingly integrated into the engine shaft 2 with transformatory energy transmission to the high-voltage discharge electrodes also enables the majority of the oil carried off with the bearing air to be re-used and clean, largely oil-free air to be vented to the atmosphere according to arrow C.

LIST OF REFERENCE NUMERALS

1 Air inlet
2 Engine shaft
3 Centrifugal oil separator
4 Metallic foam structure (Retimet®)
5 High-voltage discharge electrode
6 Rectifier and high-voltage generator unit
7 Transmitting coil (transmitter)
8 Receiving coil (receiver)
9 Connecting line
10 Collector housing
Arrow A Entering air-oil mixture
Arrow B Separated oil
Arrow C Cleaned air

What is claimed is:

1. Centrifugal oil separator for an aircraft engine for cleaning the oil particle-mixed vent air, with the oil separator including a rotating hollow body with a metallic foam structure attached therein and at least one high-voltage discharge electrode arranged upstream of the metallic foam structure, characterized in that the metallic foam structure and the high-voltage discharge electrode(s) are integrated into a hollow engine shaft and energy transmission to the high-voltage discharge electrodes is transformatory.

2. Centrifugal oil separator in accordance with claim 1, characterized in that, for transformatory energy transmission, a receiving coil is arranged, which concentrically encloses the outer circumference of the engine shaft and co-rotates with the latter and which is concentrically surrounded by a stationary transmitting coil, with the receiving coil being connected via a connecting line to a rectifier and high-voltage generator unit connected to the high-voltage discharge electrodes.

3. Centrifugal oil separator in accordance with claim 1, characterized in that the metallic foam structure is a product known under the trade name Retimet®.

4. Centrifugal oil separator in accordance with claim 1, characterized in that the metallic foam structure is earthed.

5. Centrifugal oil separator in accordance with claim 1, characterized in that a collector housing connected to the engine shaft for collecting and returning the separated oil into an oil tank is arranged on the outer circumference of the metallic foam structure.

* * * * *